United States Patent [19]

Gubin

[11] Patent Number: 4,841,902
[45] Date of Patent: Jun. 27, 1989

[54] COMBINED SPEEDOMETER AND TACHOMETER

[76] Inventor: Daniel Gubin, P.O. Box 10, Coosada, Ala. 36020

[21] Appl. No.: 909,318

[22] Filed: Sep. 19, 1986

[51] Int. Cl.⁴ ............................................. G01P 3/02
[52] U.S. Cl. ............................. 116/62.4; 116/298; 116/300; 116/301
[58] Field of Search ............... 116/300, 301, 62.4, 116/DIG. 37, 62.2, 62.3, 298; 340/52 F, 688; 73/499, 509

[56] References Cited

U.S. PATENT DOCUMENTS

| | | | |
|---|---|---|---|
| 2,702,520 | 2/1955 | Helgeby | 116/300 |
| 2,879,940 | 3/1959 | Cornell | 116/62.4 X |
| 3,807,350 | 4/1974 | Powell | 116/300 |
| 3,926,142 | 12/1975 | Okamoto | 116/DIG. 37 |

FOREIGN PATENT DOCUMENTS 3028867  2/1982  Fed. Rep. of Germany ..... 116/62.2

Primary Examiner—Glen R. Swann, III
Assistant Examiner—Brian R. Tumm
Attorney, Agent, or Firm—Berman, Aisenberg & Platt

[57] ABSTRACT

A combined tachometer/gear number indicator, preferably in further combination with a speedometer, is described for use on a motor vehicle for synchronizing engine speeds and vehicle speeds to avoid clutch wear when changing gears. A plurality of coaxial transparent dials carry gear number, engine speed and vehicle speed indicia, and markers are provided for indicating data.

9 Claims, 3 Drawing Sheets

COMBINED SPEEDOMETER AND TACHOMETER

Field of the Invention

This invention relates to instrument dials for motor vehicles.

BACKGROUND OF THE INVENTION

In driving a motor vehicle having a manual transmission, excessive wear on the clutch is caused by lack of synchronization of engine speed with drive speed when shifting gears. In order to economize, and to simplify the instrument panel in an automobile, a tachometer dial is often eliminated from all but high performance automobiles.

Prior patents have not provided a simple, clear, combined speedometer and tachometer. Powell, U.S. Pat. No. 3,807,350 describes a speedometer dial having a plurality of windows through which selected speed and gear indicia carried on a rotatable rear plate are seen. Only a small range of indicia of each category are visible through the windows. Helgeby, U.S. Pat. No. 2,702,520, shows a combined tachometer-speedometer in which a single pointer, bearing an attached flag for each gear number, indicates engine revolutions and vehicle speed on several scales marked on the front of a single dial. Thus, knowing the gear in which the vehicle is being operated, the vehicle speed can be read from the dial. There is no indication as to the engine speed required in a different gear for the same vehicle speed.

SUMMARY OF THE INVENTION

A combined speedometer and tachometer for a motor vehicle is described in which means are provided for representing vehicle speed, engine speed, and gear number in a single viewing field. One indicator points to the vehicle speed, and a second indicator, preferably mounted coaxially with the first indicator simultaneously points to both the engine speed and the engaged gear number, the dials being arranged so that the driver may readily determine the engine speed needed to maintain the vehicle speed in the gear to which the driver wishes to change. Using a combined speedometer and tachometer of the invention, engine speed may be accurately synchronized with vehicle speed when changing to a different gear.

It is an object of the invention to provide an improved combined speedometer and tachometer.

It is another object of the invention to provide a combined speedometer and tachometer in which the speed of the vehicle is indicated by a pointer on a dial, and the engine speed and engaged gear number are simultaneously indicated by a coaxial indicator which extends around the periphery of the same dial.

DETAILED DESCRIPTION OF THE INVENTION

The invention relates to a speedometer/tachometer for use in an automobile, or other vehicle having an engine and a transmission, in which it is necessary to shift transmission gears. The dial of the speedometer/tachometer displays engine speed, (revolutions per minute) against a background of moving lines, each line designating a gear number, thus representing the engine speed necessary for engaging each gear at current actual speed (miles per hour), in a single viewing field. The operator of the vehicle will see the tachometer needle pointing to both the actual engine speed as displayed on a fixed dial and to a line indicating the gear number engaged in the engine gear box. In addition, lines numbered by gear number will be displayed superimposed on the dial showing engine speed, permitting accurate synchronization of engine speed with the actual travelling speed if the operator should desire to shift to another gear while maintaining the same vehicle speed.

Figure 1:
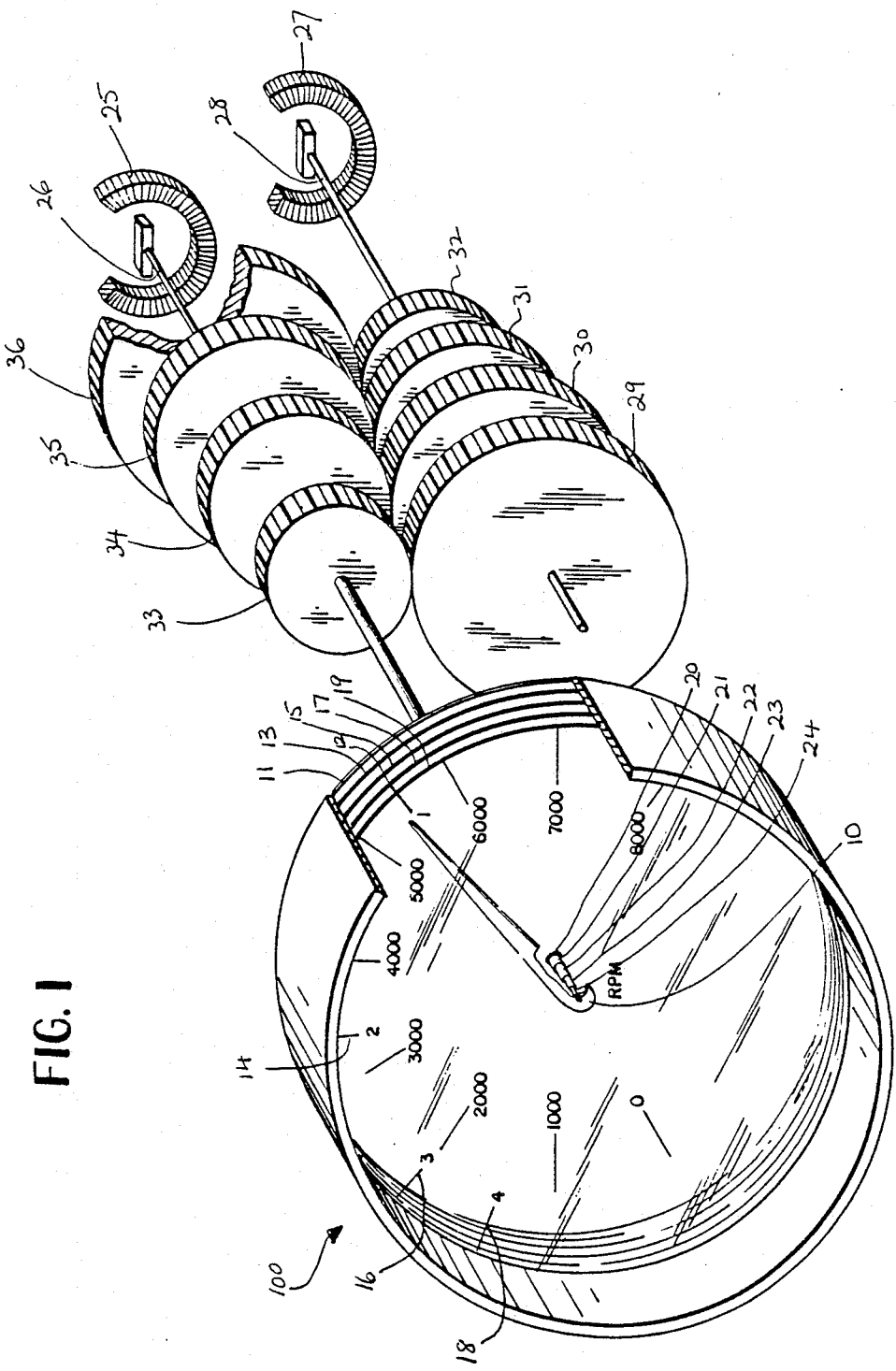
FIG. 1 shows a combined tachometer and engaged gear indicator, in partially cut away and exploded view.

Referring now to the Figures, FIGS. 1 illustrates a tachometer 100 representing the engine engaged in first gear and an engine speed of about 5400 revolutions per minute (rpm). Vehicle speed is not shown on FIG. 1. The tachometer needle 10 points to the 5400 rpm position on background dial 11. In addition, needle 10 is also pointing to line 12 which is marked with the number 1 representing first gear. Line 12 is carried about the edge of the tachometer on either a clear glass or plastic screen 13 or by a bent pointer (shown in FIG. 7) that travels around and behind dial 11 and bends around the edge of dial 11. Line 14 marked 2 represents the engine speed that would be required to engage the second gear while travelling at the same vehicle speed as that at which the engine speed is 5400 rpm in first gear. Line 14 is imprinted on a clear screen 15, similarly to line 12 on screen 13. Similarly, line 16 marked 3 (third gear) is imprinted on clear screen 17, and line 18 marked 4 (fourth gear) is imprinted on clear screen 19. The four clear screens, 13, 15, 17, and 19 turn on concentric nested shafts 20, 21, 22 and 23 respectively. Also concentric and nested with these shafts is shaft 24 which supports tachometer needle 10. If the transmission of the automobile engine had a fifth gear then the tachometer would have a fifth clear screen. If it only had three gears, then the tachometer would only have three clear screens.

A speedometer is preferably also incorporated into the apparatus of FIG. 1. The tachometer is operated in a conventional manner in that a mechanism 25 energized by the revolutions of the engine turns shaft 26 against a spring. Shaft 26 is identical with shaft 24 and is firmly attached to pointer 10 indicating the engine revolutions per minute on background dial 11. The tachometer is different from other tachometers in that a second mechanism 27 energized by the revolutions of the output shaft of the transmission, (a speedometer), turns shaft 28 against a spring. The action of mechanism 27 is counter-clockwise instead of the commonly encountered clockwise rotation of a speedometer. Gears 29 through 32 on shaft 28 mesh with gears 33 through 36 respectively on shafts 20 through 23 respectively. The ratio of the driving gears on shaft 28 to the driven gears on shafts 20 through 23 is derived from the following formula:

Let R = the ratio sought.
Let D = the diameter of the tire in feet.
Let G = the ratio of the size of the engine gear to the size of the driven wheel gear.
Let S = the number of miles per hour represented by each degree of angular rotation of mechanism 27.
Let T = the number of revolutions per minute represented by each degree of angular rotation of mechanism 25.

Then $$R = 5280 \times S / (3.1416 \times 60 \times D \times G \times T).$$

If, for example, the vehicle tire is 2 feet in diameter, and mechanism 27 turned through 30 degrees for each 10 miles per hour of vehicle speed or 0.33 miles per hour per degree of angular rotation, and mechanism 25 turned through 30 degrees for each 1000 revolutions per minute of engine speed or $33\frac{1}{3}$ revolutions per minute per degree of angular rotation, then for the vehicle transmission gear ratios listed on the left, the tachometer gear ratios required are listed on the right.

| TRANSMISSION GEAR RATIO | TACHOMETER GEAR RATIO |
|---|---|
| 1/14 | 1.96:1 |
| 1/11 | 1.54:1 |
| 1/7 | 1.19:1 |
| 2/7 | 0.49:1 |

All other gear ratios can be found using the above formula.

Shaft bearings and bearing support arms are not shown in the Figures, for clarity, and are conventional components. For shafts 20 through 23, these would be positioned adjacent to gears 33 through 36 similar in technique to an analog clock. Should it be desired to place the tachometer needle adjacent to the dial in order to minimize parallax distortion with the clear screens placed closer to the operator, then the needle 10 would be placed on outermost shaft 20 and the screens showing gear numbers would be placed on inner nested shafts 21 through 24. Mechanism 25 would be placed between gear 33 and dial 11 so that it would operate shaft 20 instead of shaft 26(24) as drawn. Gears 33 through 36 would be placed on shafts 21 through 24 respectively.

When the engine output shaft speed exceeds the calculated wheel speed, the tachometer pointer 10 will not line up exactly with the gear indicators but will be to the right of the corresponding gear indicator. This situation will occur with the use of an automatic transmission with slippage in the transmission. This needle advancement beyond the correct gear indicator is itself an indicator of transmission slippage.

Figure 4:
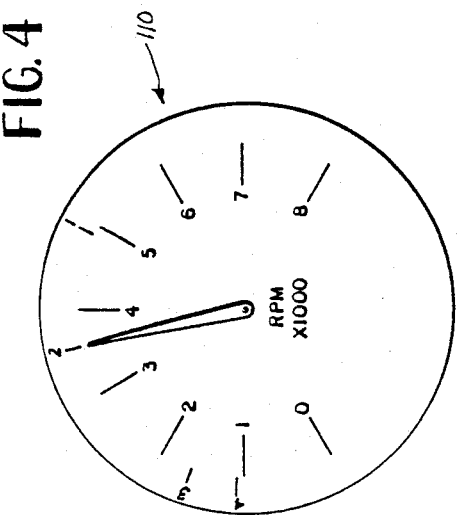
FIG. 4 represents the dial of FIG. 2 after a downward change of gear.
Figure 3:
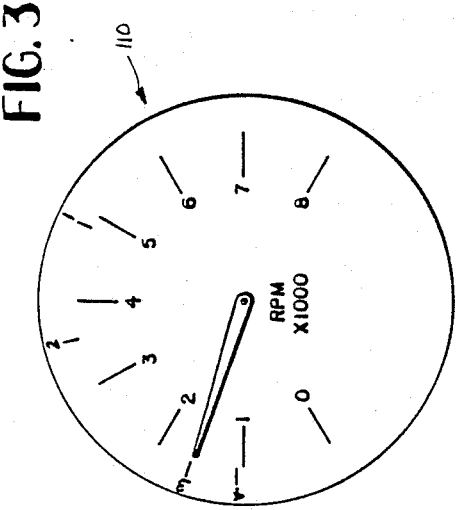
FIG. 3 represents the dial of FIG. 2 at an intermediate situation.
Figure 2:
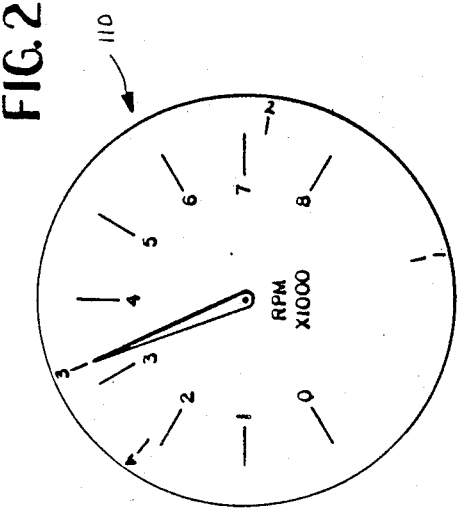
FIG. 2 shows the dial of FIG. 1 representing an initial driving situation.

FIGS. 2, 3 and 4 represent an example of a driving situation in which a combined speedometer, tachometer, and gear number indicator of the invention is useful. An operator of a vehicle travelling at 40 miles per hour in third gear at 3200 rpm enters a curve. FIG. 2 shows a tachometer 110 in the initial situation. The operator may find it necessary to slow to 20 miles per hour and to shift from third gear into second gear. The downward shift is performed routinely by increasing the engine speed while the clutch pedal is depressed. Using gear pointing tachometer 110, as described, the correct engine speed for second gear at twenty miles per hour (about 3600 rpm) is indicated permitting accurate gear shifting with minimal wear on the clutch and gears, and with minimal discomfort to driver and passengers. FIG. 3 represents the appearance of tachometer 110 at twenty miles per hour with the transmission still in third gear at 1600 rpm. FIG. 4 represents the shift as the operator increases engine speed to 3600 rpm. All of the gear pointing lines 12, 14, 16, and 18 have moved counterclockwise as the speed of the vehicle has decreased. Also, all of the gear pointing lines 12, 14, 16, and 18 have moved through different angles as the vehicle has changed speed.

Figure 6:
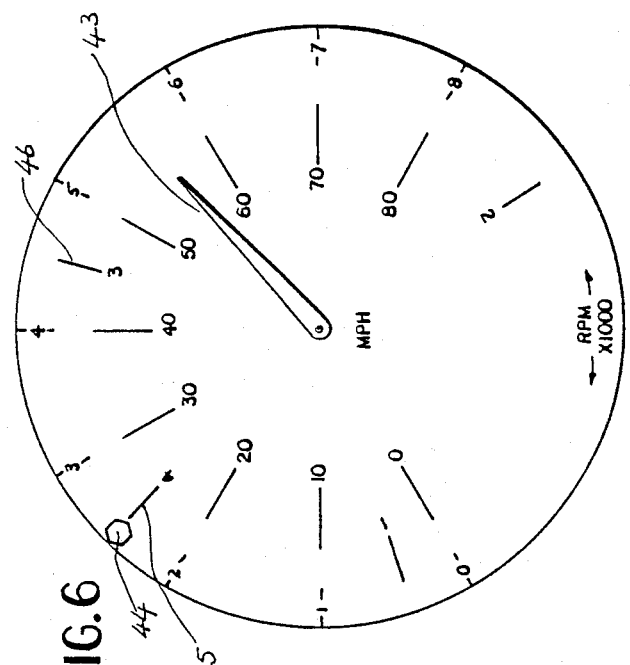
FIG. 6 shows a different embodiment of FIG. 5.
Figure 5:
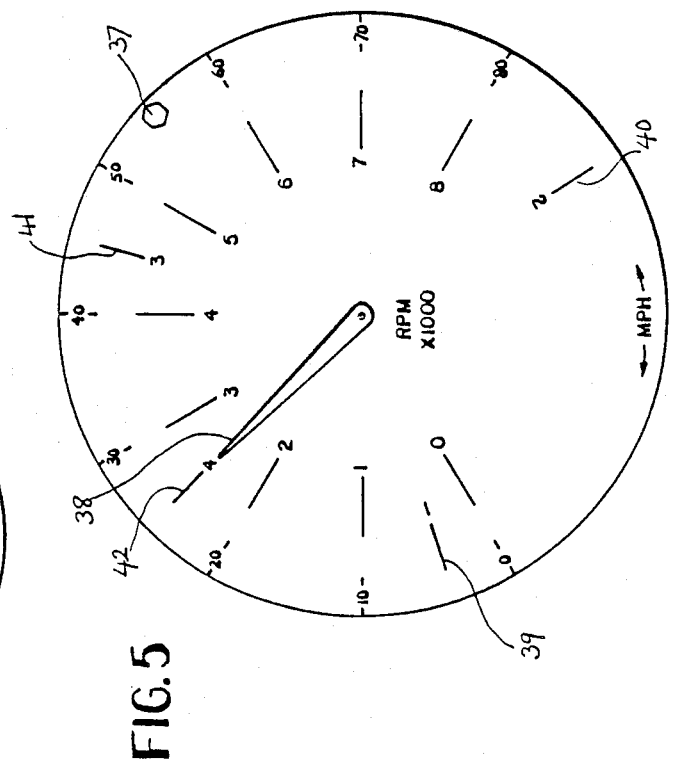
FIG. 5 shows a combined speedometer, tachometer, and gear indicator of the invention.

The speedometer and gear-pointing tachometer may be combined on one dial. If the central pointer is to represent the tachometer, then the indicator representing the speedometer is carried on a clear screen behind the dial or on a rear pointer bent around the dial's edge. FIG. 5 illustrates this situation in a vehicle with a different gear ratio than that used in FIGS. 2 to 4. The speedometer indicator is represented by a clear hexagon 37. The speed represented in FIG. 5, by hexagon 37, is 55 miles per hour. The tachometer pointer 38 and the gear indicating lines 39 through 42 operate as previously described. Line 39 marked 1 has travelled completely around the face of the dial and has begun its second revolution. FIG. 6 illustrates a combined gear pointing tachometer-speedometer in which the speedometer controls central pointer 43, and hexagon 44 (which may be a bent pointer or may be an indicator carried on a clear screen) indicates the tachometer reading. The inner point of hexagon 44 is aligned with line 45, marked 4, indicating that fourth gear is engaged. The vehicle speed shown is 55 miles per hour, while the position of hexagon 44 indicates an engine speed of 2500 rpm. To shift down to third gear, the clutch is engaged and the engine speed increased until hexagon 44, representing engine speed, is aligned with line 46 marked 3 (third gear). In both FIGS. 5 and 6, the speed indicator 37 (FIG. 5) or 43 (FIG. 6) is geared directly to the speedometer drive mechanism in a gear ratio that depends only on the miles per hour per degree of drive mechanism and the miles per hour per degree of dial display. It is clearly advantageous to the driver to have all this information relating to vehicle speed, engine speed, and gear number, displayed in a single viewing field.

Figure 7:
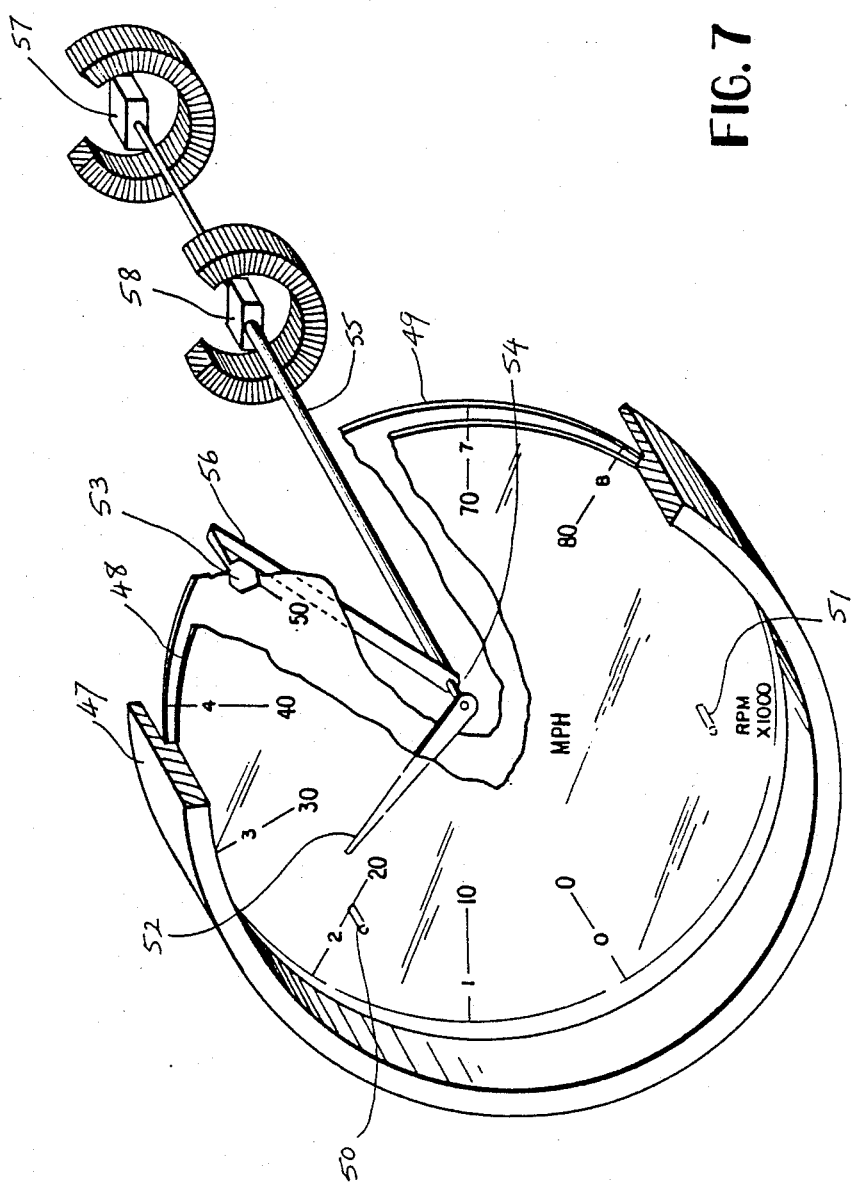
FIG. 7 shows a combined tachometer and speedometer without an indicator of engaged gear.

FIG. 7 illustrates a speedometer with only the tachometer displayed at the edge of the dial. The gear-pointing feature is not used in this embodiment. Frame 47 holds front glass 48. Dial 49 is supported by the glass at pins, two of which, 50 and 51, are drawn. The pins are so placed as to avoid speedometer pointer 52 and tachometer pointer 53 as these indicators move about the dial on concentric shafts 54 and 55 respectively. In this illustration, the tachometer pointer 53 is not supported on a clear disc as drawn previously but on a support arm 56 that rotates behind the dial 49. Support arm 56 bends around the edge of the dial 49 between dial 49 and frame 47. Shaft 54 is driven by speedometer drive mechanism 57 in the usual clockwise direction, and shaft 55 is driven by tachometer drive mechanism 58.

The combined speedometer/tachometer/gear number indicator of the invention is a simple device, advantageously providing the vehicle operator with vehicle operating information clearly represented by viewing a single viewing field, readily understood at a glance. The invention allows the vehicle operator to determine the engine speed which the vehicle must attain when changing gear while maintaining the vehicle speed at a constant figure. Alternatively, if the vehicle speed is to be changed, the appropriate engine speed and gear number are indicated.

While the invention has been described in mechanical terms, it will be apparent to one skilled in the art that the action of many parts of the device may be performed electronically. As non-limiting examples, the action of the gears in the tachometer may be performed using a computer microprocessor, and/or light emitting diodes may be used for part or all of the display. Full use may freely be made of integrated circuits, computer operations, electronic displays, and other automated means for performing the described operations, as is well known to one skilled in the art of computerized and electronic functions, to provide a combined tachometer and speedometer of the invention.

While the invention has been described above with respect to certain embodiments thereof, it will be appreciated that various changes and modifications may be made without departing from the spirit and scope of the invention.

What is claimed is:

1. A combined tachometer and gear number indicator for a motor vehicle comprising a plurality of individual display means for separately representing engine speed and each gear number, and indicator means for simultaneously indicating both the engine speed and engaged gear number, wherein engine speed and each gear number are displayed on said individual separate display means, each said display means rotating independently of each of the other display means on an axis separate from and concentric with axes of each of the other display means, said indicator means simultaneously indicating, in a single viewing field, both the engine speed and engaged gear number.

2. A combined speedometer and tachometer for a motor vehicle comprising a plurality of individual display means for representing engine speed, gear number and vehicle speed in a single viewing field, comprising
   a single first indicator means for simultaneously indicating both engine speed and engaged gear number, wherein engine speed and each individual gear number are displayed on said individual display means, each said display means rotating independently of each of the other said display means on an axis separate from and concentric with axes of each of the other display means, said single first indicator means simultaneously indicating to the viewer both the engine speed and engaged gear number, and
   second indicator means for indicating vehicle speed, wherein engine speed may be accurately synchronized with vehicle speed when changing to a different gear.

3. Apparatus of claim 2 wherein the display means comprises a plurality of markers, each marker bearing indicia of a gear number.

4. Apparatus of claim 2 wherein one of said indicator means is located in front of display means and the other of said indicator means is located behind at least one of the display means.

5. Apparatus of claim 2 wherein at least one of said display means bears its indicia at the periphery of a dial.

6. Apparatus of claim 2 wherein the display means comprises a plurality of transparent dials, each gear number being indicated on a separate dial.

7. Apparatus of claim 6 further comprising a transparent dial bearing indicia of engine speed.

8. Apparatus of claim 6 further comprising a transparent dial bearing indicia of vehicle speed.

9. Apparatus of claim 8 further comprising a transparent dial bearing indicia of engine speed.

* * * * *